Patented June 10, 1924.

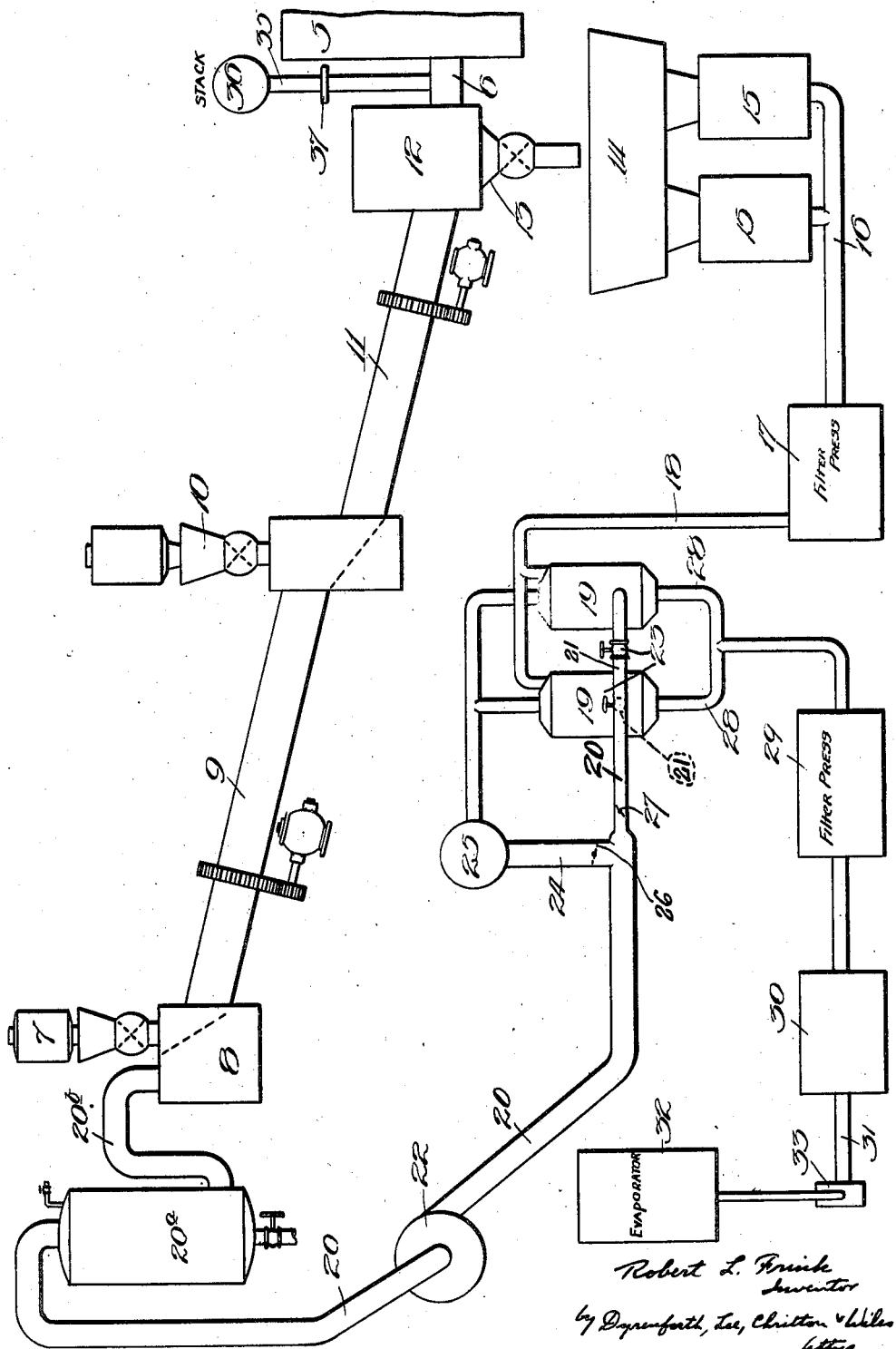

1,497,263

UNITED STATES PATENT OFFICE.

ROBERT L. FRINK, OF COLUMBUS, OHIO.

PROCESS FOR THE TREATMENT OF SILICATE COMPOSITIONS.

Application filed June 16, 1919. Serial No. 304,522.

*To all whom it may concern:*

Be it known that I, ROBERT L. FRINK, a citizen of the United States, residing at Columbus, in the county of Franklin and State of Ohio, have invented a new and useful Improvement in Processes for the Treatment of Silicate Compositions, of which the following is a specification.

The present invention relates to processes for the treatment of silicate compositions and for the utilization of waste gases containing carbon dioxide, carbon monoxide, water and sulphur trioxide, such as those from glass furnaces.

Among the objects of the present invention are to utilize the waste heat and the chemical constituents of gases issuing from furnaces such as glass furnaces, to produce economically and efficiently alkali metal salts and silicates readily available and in proper proportions for use, particularly in the manufacture of glass, to effect the decomposition of silicate minerals in an efficient and economical manner and such other objects as will more fully hereinafter appear.

In carrying out the present invention I utilize as the primary reacting materials the naturally occurring silicates and the chlorides of alkali metals, preferably sodium chloride. The silicates which are employed are preferably argillaceous in character, such as kaolin, clay, argillaceous shale or coal refuse, or feldspars, such as orthoclase. These primary materials are brought to a reacting temperature in the presence of water or water vapor, this being effected by utilizing hot waste gases such as those given off by blast furnaces, which contain among their constituents $H_2O$, $CO_2$, $CO$, $SO_3$ and $SO_2$. The reaction thus brought about results in the formation of a silicate in which the alkali metal of the chloride, usually sodium, is combined, and in the formation of hydrochloric acid gas, which is carried along by the gases.

To the mixed silicate thus produced, and at least at the temperature of reaction, lime or an equivalent material is added, and a reaction between the lime and the mixed silicate is effected by an increase in temperature of the mixture. The mixed silicate prior to this reaction will be a combined silicate of aluminum and one or more alkali metals, depending upon the character of the initial silicate mineral or mixture of silicate minerals employed. The effect of its reaction with the lime may be controlled by suitable regulation of the relative quantity of lime supplied thereto, or of the temperature or the duration of the reaction or of any combination of these factors. It appears that the lime tends to replace the metals in the silicate, a complete reaction with sufficient lime hence resulting in the decomposition of the mixed silicate into a calcium silicate and aluminates of the alkali metals together with salts of the alkali metals such as sulphates and carbonates resulting from reaction with the sulphur trioxide in the waste gases utilized for heating. Reaction with less lime or incomplete reaction apparently results in the formation of insoluble mixed silicates of the lime and the alkali metal or metals, together with alumina in varying amounts, apparently in part combined in the silicate formed and in part with the alkali metals as aluminates.

After completion of the reaction with lime the resulting mass is leached with water, which removes the soluble constituents of the mass, consisting primarily of the aluminates and sulfates of the alkali metals. The insoluble residue will, in the case of a complete reaction with the lime, consist primarily of calcium silicate, and, in case of incomplete reaction, of a mixed silicate of calcium and alkali metals with small amounts of alumina. By suitable control of the reaction, preferably through regulation of the amount of lime permitted to react, I am able to produce as a final product an insoluble material containing the proper constituents for glass making already partially combined and in proportions approaching those proper for the manufacture of glass.

The liquor resulting from the leaching of the end product of the reaction may then be treated with the waste gases previously used in supplying the heat for the reaction. These gases, which contain $CO_2$, decompose the aluminates in the liquor, forming aluminum hydroxide, which is precipitated, and sulfates and carbonates of the alkali metals which remain in solution. These salts will, if orthoclase or a feldspar has been used, contain potassium as well as sodium. On concentration the mixture of sulfates and carbonates may be utilized directly as "glass-makers' salt" the sulfate therein being effective in producing a brilliant or crystal glass.

The sulfate therein, may, however, if desired, be converted into carbonate by the usual means employed in chemical arts for said conversion.

In the accompanying drawing I have illustrated in diagrammatic form suitable means for carrying out the present invention, employing in the present embodiment thereof the waste gases emitted from a glass furnace indicated at 5. These gases contain, in addition to the $CO_2$ and other products of combustion, the $CO_2$ and $SO_3$ derived from the reactions of the glass batch, and leave the furnace 5 at a temperature which may approximate 800 to 1100° C. These gases pass through a suitable conduit 6 into the reaction zone, which, in the present embodiment of this invention, is illustrated as the interior of a rotary furnace. This rotary furnace is suitably constructed in two portions into the first of which, that most remote from the point of entry of the hot gas, the batch of material to be treated is fed. This material consists of the argillaceous material, such as clay, together with salt in the proportions of 1000 parts of clay to 2000 parts of salt. This mixture is fed from a mixer 7 into a chamber 8, out of which it passes into the first reaction zone, the interior of the first section 9 of the rotary furnace. In its passage thru the furnace section it is brought to a temperature of from 600–700° C., the reaction resulting from the heat applied and from the water content of the gas producing HCl together with a sodium alumino-silicate.

At this point the lime or lime producing constituent, such as limestone, is introduced in comminuted form into the furnace through the hopper 10. Lime or limestone may be utilized, the amount being proportioned to the extent of the decomposition of the silicate desired in the travel of the mixture through the second section of the furnace 11. For a complete decomposition of the silicate with limestone the proportion of the latter introduced should be from 1700 to 2000 pounds for each thousand pounds of clay introduced into the original mixture. The limestone passes through the second furnace section 11 in admixture with the reaction mass produced in the first section of the furnace 9, attaining therein a temperature of approximately 800 to 1000° C. as may be required. The resulting mass produced by the reaction discharges from the furnace section 11 into a chamber 12, provided with a suitable hopper bottom 13, which will permit discharge of the material without permitting escape of gas. The entire mass passes into a storage receptacle 14 from which it may be passed into suitable leaching tanks 15.

In the leaching tanks the reaction mass is treated with water, which removes the soluble salts, consisting primarily of the aluminates and sulfates of the alkali metals. The liquor resulting from the leaching process is passed through conduits 16 to a filter 17, which serves to remove insoluble materials from the liquor.

The composition of the insoluble matter remaining in the leaching tank and in the filter press depends upon the extent of the decomposition effected in the second stage of the reaction in furnace section 11. As hereinbefore described, in case of complete decomposition it consists practically entirely of calcium silicate and in the case of incomplete decomposition of a mixed silicate of calcium and the alkali metals, with perhaps a small proportion of combined alumina. This insoluble material is removed and utilized as hereinafter described.

The solution leaving the filter press 17 passes through conduit 18 into suitable agitating tanks 19. In these agitating tanks the liquid is treated with the gas passing out of the first furnace section 9, which gas may first be passed through a condenser or treating tower 20$^a$ in which the HCl and phosgene present may be utilized to remove iron from sands or like materials by causing the latter to pass in counter current to the gas. From the tower 20$^a$ the gas is passed through conduit 20 and suitable branch conduits 21, 21 into the agitating tanks. A fan, 22, may be provided to insure a proper movement of the gas. Suitable valves 23, 23 interposed in the branch conduits, 21, 21 control the supply of gas to the agitating tanks. An additional branch conduit 24 is provided from the gas conduit 20, which branch conduit leads to the waste stack 25. This branch conduit 24 is provided with a suitable damper or valve 26 and a like damper 27 is provided in the conduit 20 after the point of departure therefrom of the branch conduit 24. By means of dampers 26 and 27, the passage of the gases to the stack and to the agitating tanks may be controlled.

In the agitating tank the carbon dioxide content of the gases causes the precipitation of the aluminum as aluminum-hydroxide, forming carbonates in the solution. Inasmuch as the solution already contains sulfates of the alkali metals, it now contains a mixture of sulfates and carbonates thereof. Any HCl remaining in the gases passing to the treating tanks may be removed by condensation if alkali metal salts free from chlorides are desired.

The suspension in the agitating tanks after the completion of the reaction is discharged through pipes 28 into filter press 29 in which the suspended alumina is separated from the liquid and from this passes into sump 30. The liquid is passed from the sump 30 through pipe 31 into the evaporators 32 by means of pump 33. In evaporators 32 the liquid is concentrated to effect crystallization of the salts contained therein. The resulting salt comprises, in the case of the use of a clay, the sulfate and carbonate of sodium, and in case potassium-containing silicates were originally used, for instances orthoclase feldspar, the salt will consist of sulfates and carbonates of sodium and potassium.

In the operation of the various gas conduits it is apparent that a constant draft must be maintained for the proper operation of the furnace from which the heating and reacting gases are obtained. This regulation is, in the embodiment of the present invention as illustrated, secured by a suitable control of the dampers 26 and 27 in the conduits 24 and 20, which dampers, if desired, may be automatically controlled by the pressure in the various conduits.

Furthermore, in order that the total volume of gas and the temperature of the furnace sections 9 and 11 may be controlled without impairing the operation of the furnace 5 from which the gas is secured, the conduit 6 is provided with a branch conduit 35 leading to a stack 36 and provided with a damper or valve 37.

It is readily apparent that in carrying out the present invention the relative amounts of salt and lime or limestone used are dependent upon the silicate content of the primary argillaceous materials used. Thus if orthoclase feldspar is utilized instead of clay, the amounts of salt and limestone necessary for complete reaction are somewhat larger than in the case of clay, by reason of the higher proportion of silicate in orthoclase. In the proportions stated hereinbefore for complete reaction of the clay, the amount of salt would not need to be varied substantially in substituting orthoclase for the clay, as a considerable excess of salt is there indicated. In the case of the limestone, however, the relative amounts added should be some forty or fifty per cent greater in the case of orthoclase where complete reaction is desired.

Where the reaction has been carried to completion, for example in the case of clay, the products obtained are essentially an insoluble calcium silicate, alumina and a mixture of sodium carbonate and sodium sulfate. The calcium silicate may be directly utilized in the glass making process, together with such amounts of the alumina as may be desired for the particular glass contemplated. The mixture of sulfate and carbonate, which I designate by the term "glass-makers' salt" is likewise directly available for use in the glass-making process. By using as the initial material a substance such as orthoclase feldspar I am enabled to produce as one of the final products a salt composed of the carbonates and sulfates of sodium and potassium, a high-grade potash salt thus being produced in a very economical manner. The proportions of sodium and potassium salts contained in this product will be directly dependent upon the relative proportions of sodium and potassium in the feldspar used.

By controlling the reaction with the lime in the second portion of the reaction furnace, which may preferably be accomplished by a control of the supply of the limestone, the proportions of the ingredients in the insoluble silicate ultimately produced may be varied at the will of the operator. Thus, with the use of clay or hydrous aluminum silicate as the initial argillaceous material, on adding at the second stage of the reaction lime in the proportion of 1500 to 1700 pounds for each thousand pounds of the clay used, the insoluble silicate produced and left as a residue on leaching the reaction product will have a composition of from 65% to 75% silica, 15% to 25% lime, 3% to 10% alumina and 10% to 15% soda ($Na_2O$) and may be used directly for the manufacture of glass.

The various impurities contained in the clay and limestone will be to a considerable extent eliminated in the process of the reaction. Thus iron compounds contained in the clay will be largely volatilized as chloride in the reaction of the clay with the salt in the presence of steam or water vapors. Magnesia will, to a certain extent, follow the lime and be combined in a small proportion in the insoluble silicate formed at the end of the reaction.

Although I have hereinbefore described my invention in detail, and have set forth certain theories in connection therewith, which, at the present time are believed to be correct, I do not intend that my invention shall be limited by the accuracy of such theories, nor by the details recited, except in so far as such limitations are contained in the following claims.

I claim:

1. The process of producing a mixed silicate suitable for use in glass manufacture which consists in subjecting a silicate and an alkali metal chloride to the action of heat and a decomposing gas, and treating the resulting reaction mixture with an active alkaline earth containing reagent in controlled amounts to partially decompose the same.

2. The process of forming a mixed silicate for glass manufacture which consists in treating clay with salt and a decomposing gas under reacting conditions, treating the resulting silicate with lime in amounts sufficient to partially decompose the same and leaching the resulting reaction mass.

3. The process of forming a silicate for glass manufacture containing calcium, aluminum and alkali metals which consists in subjecting an insoluble aluminum silicate to the action of an alkali metal chloride in the presence of a decomposing gas, reacting upon the resulting reaction mixture with lime in quantity sufficient to incompletely decompose the same, and leaching the soluble constituents from the mixture thus produced.

4. The process of forming a silicate for glass manufacture containing calcium, aluminum and alkali metals, and recovering soluble products simultaneously produced which consists in treating an insoluble alkali-metal containing silicate with salt and a decomposing gas under reacting conditions, treating the resulting silicate with lime in amount sufficient to partially decompose the same, leaching the resulting mass, passing carbon dioxide containing gas through the resulting solution, separating the precipitate of alumina produced thereby and concentrating the resulting solution to remove the alkali metal salts therefrom.

5. The process of forming a silicate for glass manufacture containing calcium, aluminum and alkali metals, and recovering the soluble compounds simultaneously produced which consists in treating clay with salt and a decomposing gas under reacting conditions, treating the resulting silicate with lime in amount sufficient to partially decompose the same, leaching the resulting mass and passing carbon dioxide-containing gas through the resulting solution.

6. The process of forming a silicate for glass manufacture containing calcium, aluminum and alkali metals, and recovering the soluble compounds simultaneously produced which consists in treating clay with salt and a decomposing gas under reacting conditions, treating the resulting silicate with lime in amount sufficient to partially decompose the same, leaching the resulting mass, passing carbon dioxide containing gas through the resulting solution, separating the precipitate of alumina produced thereby and concentrating the resulting solution to remove the alkali metal salts therefrom.

7. The process of forming a silicate for glass manufacture containing calcium, aluminum and alkali metals which consists in reacting upon an alkali metal-aluminosilicate with an alkaline-earth in quantity sufficient to incompletely decompose the same.

8. A silicate produced by the reaction of lime on sodium alumino-silicate and containing 65% to 75% silica, 15% to 25% lime, 3 to 10% alumina, and 10% to 15% soda ($Na_2O$).

ROBERT L. FRINK.